Nov. 16, 1926.

S. T. HOBBS 1,607,079

LOCK WASHER

Filed Sept. 24, 1924

Inventor
Samuel T. Hobbs
By Attorneys
Southgate & Southgate

Patented Nov. 16, 1926.

1,607,079

UNITED STATES PATENT OFFICE.

SAMUEL T. HOBBS, OF WORCESTER, MASSACHUSETTS, ASSIGNOR TO THE WASHBURN COMPANY, OF WORCESTER, MASSACHUSETTS, A CORPORATION OF MASSACHUSETTS.

LOCK WASHER.

Application filed September 24, 1924. Serial No. 739,698.

This invention relates to a lock washer of the well known type in which the washer consists of an annular ring cut through radially at one point and distorted out of its original plain shape so that it as a whole constitutes a single convolution of a helix or substantially that. These washers have been on the market for a long time and have performed good service.

The principal object of this invention is to provide washers of this general nature with simple means for additionally preventing the turning of the nut under which the washer is placed and also the turning of the washer on a metal part against which it is forced by the nut, and at the same time to provide this improvement in such form that it will not add materially to the cost of this article which is very low.

Reference is to be had to the accompanying drawings, in which—

Figure 1:
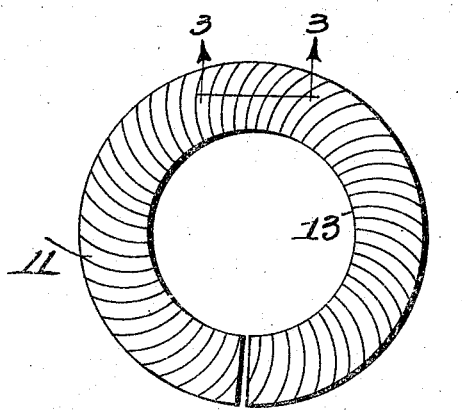
Fig. 1 is a plan of a lock washer constructed in accordance with this invention.
Figure 2:
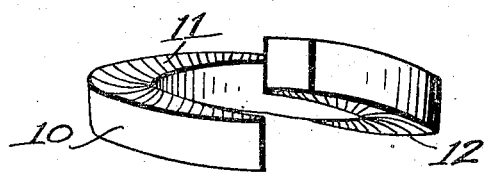
Fig. 2 is a side view of the same taken from the position of the slit.
Figure 3:
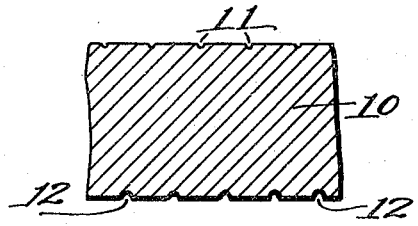
Fig. 3 is a cross section on the line 3—3 of Fig. 1.

The drawings show a split washer 10 of the ordinary kind above indicated provided on both sides with a series of grooves 11 and 12. The grooves 11 on the upper side as shown are not radial but are curved. These grooves on this side all have the same characteristic. Beginning at the inner wall 13 of the washer, they start out substantially radially and then curve backwardly, that is reversely with respect to the direction of unscrewing of a nut placed on this surface. In this way they tend to prevent the slipping of the nut backwardly after it is tightened up. If it starts to unscrew it has to rub across a surface that is transversely ribbed. If the ribs and grooves turned in the opposite direction they would tend to resist screwing up but not unscrewing the nut.

On the opposite surface there are similar grooves 12 as stated which also turn backwardly in the same way and prevent the lock washer creeping on the surface on which it is screwed by the nut. These grooves and ribs resist rotation of the washer backwardly but not forwardly. Considered from the same side the grooves curve oppositely. Thus the washer is reversible.

These grooves in both cases are spaced close together and, although they have been referred to as grooves, of course it is the wall of the groove that acts to hold the washer and nut in the position in which they are placed. Theoretically, projections could be provided shaped in the same way for this purpose, but it is easier and less expensive to form grooves. They can be formed by cutting or stamping as may be desired and spaced differently according to the work which they are to perform.

By this construction any tendency of the nut to unscrew is directly resisted by the grooves on top of the washer while any tendency of the washer to turn back is also resisted by the grooves on its under surface. Spring lock washers usually have a tendency to spread when tightened up. Sometimes they expand so much as to release the nut. These provisions counteract that tendency by drawing the split ends of the washer together. The additional features of this invention are provided without adding materially to the cost of the lock washer.

Although I have illustrated and described only a single form of the invention and shown it as applied to only a single form of lock washer, I am aware of the fact that it is capable of more general application and that modifications can be made in the exact construction shown without departing from the scope of the invention as expressed in the claims. Therefore, I do not wish to be limited in these respects, but what I do claim is:—

1. As an article of manufacture, a lock washer of the single convolution spring type having outwardly extending lines forming grooves on both surfaces thereof, of curved form extending from the center forwardly with respect to the direction of rotation when screwing on a nut so as to tend to contract the free ends of the washer when the nut is being tightened.

2. As an article of manufacture, a split lock washer having outwardly extending grooves on a flat surface extending from the inner to the outer wall and being curved backwardly with respect to the direction of unscrewing rotation of a nut in contact therewith.

3. As an article of manufacture, a spring washer having on the flat side thereof a series of transverse fine teeth with flat tops curving outwardly in a direction the reverse of the direction of rotation when unscrewing.

In testimony whereof I have hereunto affixed my signature.

SAMUEL T. HOBBS.